(12) United States Patent  
Rivas et al.

(10) Patent No.: US 7,965,677 B2
(45) Date of Patent: Jun. 21, 2011

(54) MOBILE COMPUTER WITH UNATTENDED ONLINE CONTENT PROCESSING

(75) Inventors: Mario A. Rivas, Austin, TX (US); James T. Black, Austin, TX (US); Terry L. Cole, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 931 days.

(21) Appl. No.: 11/865,974

(22) Filed: Oct. 2, 2007

(65) Prior Publication Data
US 2009/0086661 A1 Apr. 2, 2009

(51) Int. Cl.
*H04W 4/00* (2009.01)
(52) U.S. Cl. ......... 370/328; 370/401; 455/571; 709/217
(58) Field of Classification Search .................. None
See application file for complete search history.

(56) References Cited

U.S. PATENT DOCUMENTS

| 7,715,351 | B2 * | 5/2010 | Karaoguz et al. | 370/338 |
|---|---|---|---|---|
| 2002/0164973 | A1 * | 11/2002 | Janik et al. | 455/403 |
| 2004/0110490 | A1 * | 6/2004 | Steele et al. | 455/412.1 |
| 2007/0091855 | A1 * | 4/2007 | Karaoguz et al. | 370/338 |
| 2007/0178830 | A1 * | 8/2007 | Janik et al. | 455/3.06 |
| 2008/0080411 | A1 * | 4/2008 | Cole | 370/328 |
| 2008/0080412 | A1 * | 4/2008 | Cole et al. | 370/328 |
| 2008/0080413 | A1 * | 4/2008 | Cole et al. | 370/328 |

* cited by examiner

*Primary Examiner* — Bob A Phunkulh
(74) *Attorney, Agent, or Firm* — Hamilton & Terrile, LLP; Gary W. Hamilton (57) ABSTRACT

A system, method and program code are disclosed for the unattended monitoring, retrieval and storage of online content by a mobile information processing system operating in a low power mode. An intelligent wireless modem is activated when a mobile information processing system is operating in a low power state. The intelligent wireless modem detects the availability of a predetermined wireless network and establishes a connection. Predetermined online sites and services are then monitored by an unattended online content processor for the identification, retrieval, and subsequent storage of predetermined content. The stored content is subsequently retrieved and presented to the user for review and other operations when the mobile information processing system enters an initialization state.

20 Claims, 5 Drawing Sheets

MOBILE COMPUTER WITH UNATTENDED ONLINE CONTENT PROCESSING

BACKGROUND OF THE INVENTION

1. Field of the Invention

Embodiments of the invention relate generally to information processing and communication systems. More specifically, embodiments of the invention provide a system, method and program code for the unattended processing of online content by a mobile information processing system operating in a low power mode.

2. Description of the Related Art

Advances in microprocessor design and manufacturing have led to the evolution of powerful computing platforms with small form factors, modest power consumption, and low heat dissipation. These platforms have been adopted for use in a wide variety of wireless-enabled mobile devices that include cell phones, smartphones, personal digital assistants (PDAs), tablet PCs, and laptop computers. Today, it is common a mobile user to travel with a laptop computer that is implemented with a wireless modem to access wireless local area networks (WLANs), such as those based on variations of the IEEE 802.11 specification, often referred to as WiFi. It is also becoming common for these same mobile platforms to now be implemented with similar wireless modems for accessing wireless wide area networks (WWANs). These networks are based on a wide variety of industry standards including two and a half generation (2.5G) wireless technologies such as global system for mobile communications (GPRS) and enhanced data rates for GSM evolution (EDGE). Third generation (3G) wireless technologies that are being implemented include universal mobile telecommunications system (UMTS) or wideband code division multiple access (W-CDMA). Other 3G WWAN standards such as evolution-data optimized (EVDO), IEEE 802.16 (WiMAX), wireless broadband (WiBro), high-speed downlink packet access (HSDPA), and high-speed uplink packet access (HSUPA) are in the process of being implemented, with fourth generation (4G) wireless technologies on the horizon.

Current laptop computers provide processing, storage, display and communications capabilities that rival desktop units, all in a reasonably lightweight package. However, returning these units to a full power state can take as long as a stationary system unless they are placed in standby mode. In some cases, these time delays can be lengthy even when the laptop is in a hibernation mode. As a result, the user is typically required to wait for their laptop to return to full power status before they can establish wireless network connectivity.

There are times when it is inconvenient, or takes too long, for a user to power-up their laptop when they simply want to connect to a network and retrieve on-line content such as their email or field service work orders. Furthermore, the ongoing need to be productive and efficient is now driving mobile users to demand that their messages and other content be immediately available, whenever they need it and wherever they may be. As an example, it would be advantageous for a mobile user's laptop to be in a low power mode, yet automatically connecting to a wireless network whenever, wherever, and however connectivity was available. It would monitor the user's online accounts, retrieving their messages and other predetermined content as it became available. The retrieved messages and content would be stored for immediate presentation as their laptop was being restored to a full power state. The user could then be able to review the stored content even before the laptop was fully powered up or operational. However, this ability does not currently exist.

SUMMARY OF THE INVENTION

A system, method and program code are disclosed for the unattended monitoring, retrieval and storage of online content by a mobile information processing system operating in a low power mode. In various embodiments of the invention, an intelligent wireless modem is activated when a mobile information processing system is operating in a low power state. Once activated, the intelligent wireless modem performs connectivity detection operations to determine the availability of a predetermined wireless network. If the presence of wireless connectivity is detected, the intelligent wireless modem establishes and maintains an optimal connection.

Once an optimal connection is established, user and service proxies are initiated. In one embodiment, proxy information is implemented to generate a secure network connection. Predetermined online sites and services are then monitored by an unattended online content processor for the identification, retrieval, and subsequent storage of predetermined content. Concurrently, the power state of the mobile information processing system is monitored. If the mobile information processing system enters an initialization state, such as when the unit is returning to full power state, the unattended online content processor determines whether any retrieved online content is stored within an intelligent wireless modem.

Content stored in an intelligent wireless modem is then accessed and presented to the user for review and other operations (e.g., read, reply, delete, etc.). In one embodiment the unattended online content processor presents stored content to the user before the mobile information processing system has completed its initialization. In another embodiment, the unattended online content processor transfers the information stored in the intelligent wireless modem to a predetermined storage location in the mobile information processing system. The transferred information is then made available to the user when the associated application is initiated.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system, method and program code are disclosed for the unattended monitoring, retrieval and storage of online content by a mobile information processing system operating in a low power mode. In various embodiments, an intelligent wireless modem is activated when a mobile information processing system is operating in a low power state. Once activated, the intelligent wireless modem detects the availability of a predetermined wireless network and establishes an optimal connection. Predetermined online sites and services are then monitored by an unattended online content processor for the identification, retrieval, and subsequent storage of predetermined content. If the mobile information processing system enters an initialization state, the stored content is retrieved and presented to the user for review and other operations.

Figure 1:
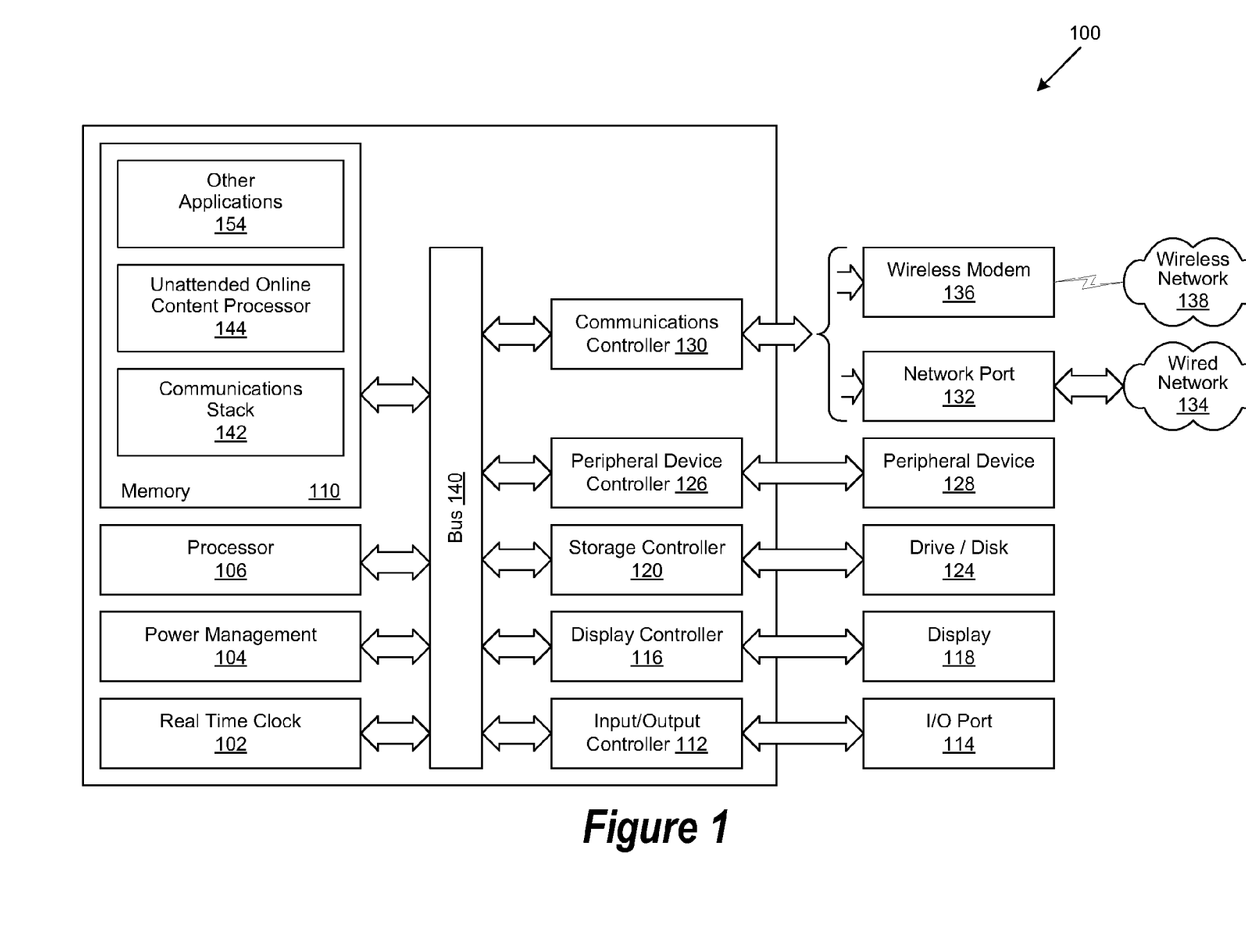
FIG. 1 is a generalized block diagram illustrating an information processing system 100 as implemented in accordance with an embodiment of the invention.

FIG. 1 is a generalized block diagram illustrating an information processing system 100 as implemented in accordance with an embodiment of the invention. System 100 comprises a real-time clock 102, a power management module 104, a processor 106 and memory 110, all physically coupled via bus 140. In different embodiments, memory 110 comprises volatile random access memory (RAM), non-volatile read-only memory (ROM), non-volatile flash memory, or any combination thereof. In one embodiment, memory 110 also comprises communications stack 142, unattended content processor 144, and other applications 154.

Also physically coupled to bus 140 is an input/out (I/O) controller 112, further coupled to a plurality of I/O ports 114. In different embodiments, I/O port 114 may comprise a keyboard port, a mouse port, a parallel communications port, an RS-232 serial communications port, a gaming port, a universal serial bus (USB) port, an IEEE1394 (Firewire) port, or any combination thereof. Display controller 116 is likewise physically coupled to bus 140 and further coupled to display 118. In one embodiment, display 118 is separately coupled, such as a stand-alone, flat panel video monitor. In another embodiment, display 118 is directly coupled, such as a laptop computer screen, a tablet PC screen, or the screen of a personal digital assistant (PDA). Likewise physically coupled to bus 140 is storage controller 120 which is further coupled to mass storage devices such as a tape drive or hard disk 124. Peripheral device controller is also physically coupled to bus 140 and further coupled to peripheral device 128, such as a random array of independent disk (RAID) array or a storage area network (SAN).

In one embodiment, communications controller 130 is physically coupled to bus 140 and is further coupled to network port 132, which in turn couples the information processing system 100 to one or more physical networks 134, such as a local area network (LAN) based on the Ethernet standard. In other embodiments, network port 132 may comprise a digital subscriber line (DSL) modem, cable modem, or other broadband communications system operable to connect the information processing system 100 to network 134. In these embodiments, network 134 may comprise the public switched telephone network (PSTN), the public Internet, a corporate intranet, a secure private network, or any combination of telecommunication technologies and protocols operable to establish a network connection for the exchange of information.

In another embodiment, communications controller 130 is likewise physically coupled to bus 140 and is further coupled to wireless modem 136, which in turn couples the information processing system 100 to one or more wireless networks 138. In one embodiment, wireless network 138 comprises a personal area network (PAN), based on technologies such as Bluetooth or Ultra Wideband (UWB). In another embodiment, wireless network 138 comprises a wireless local area network (WLAN), based on variations of the IEEE 802.11 specification, often referred to as WiFi. In yet another embodiment, wireless network 138 comprises a wireless wide area network (WWAN) based on an industry standard including two and a half generation (2.5G) wireless technologies such as global system for mobile communications (GPRS) and enhanced data rates for GSM evolution (EDGE). In other embodiments, wireless network 138 comprises WWANs based on existing third generation (3G) wireless technologies including universal mobile telecommunications system (UMTS) and wideband code division multiple access (W-CDMA). Other embodiments also comprise the implementation of other 3G technologies, including evolution-data optimized (EVDO), IEEE 802.16 (WiMAX), wireless broadband (WiBro), high-speed downlink packet access (HSDPA), high-speed uplink packet access (HSUPA), and emerging fourth generation (4G) wireless technologies.

Figure 2:
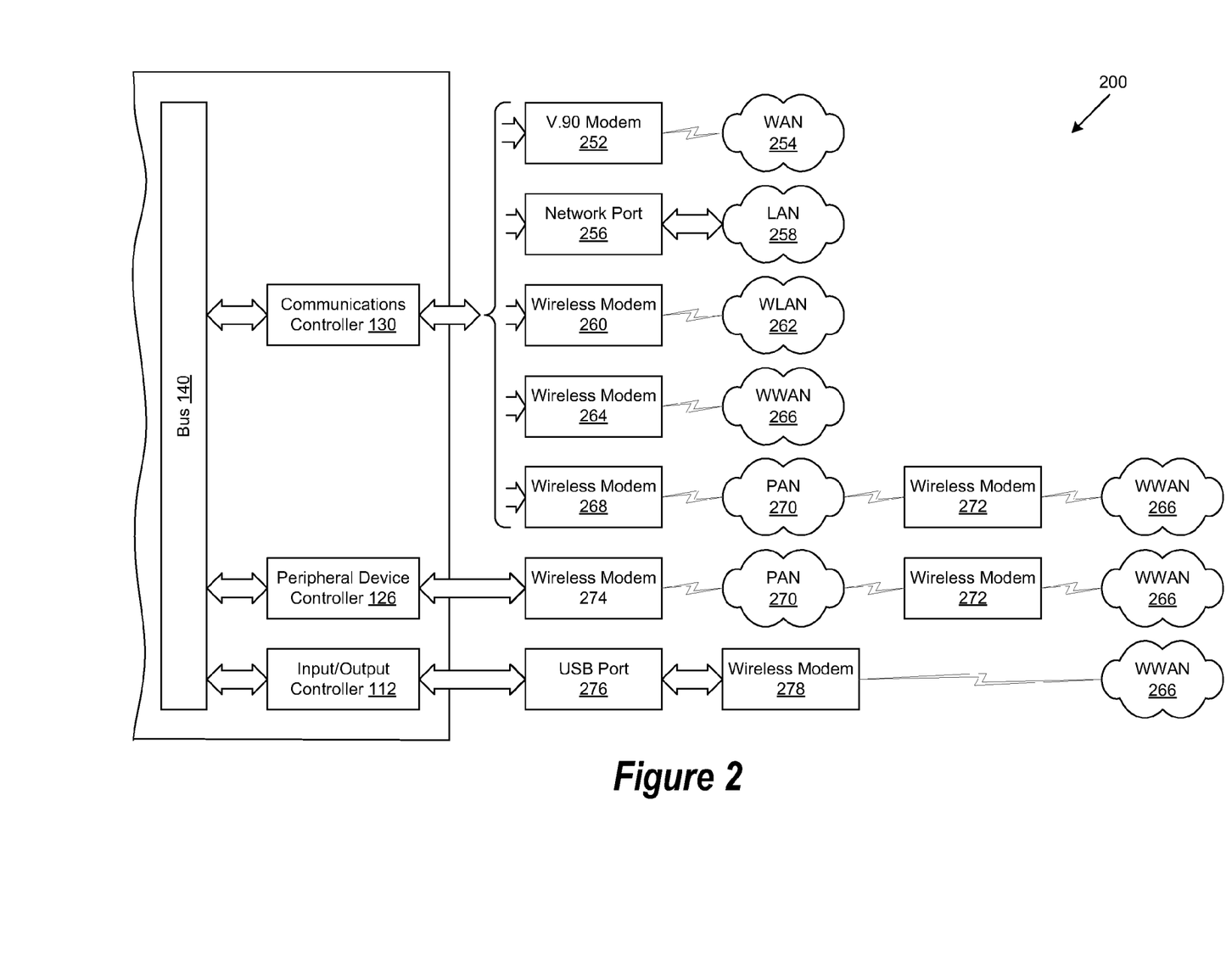
FIG. 2 is a simplified block diagram of an embodiment of the invention as implemented to connect an information processing system to a plurality of networks.

FIG. 2 is a simplified block diagram of an embodiment of the invention as implemented to connect an information processing system 200 to a plurality of networks. In various embodiments, communications controller 130, peripheral device controller 126, and input/output (I/O) controller 112 are physically coupled to bus 140. In one embodiment, communications controller 130 is further physically coupled to V.90 modem 252, which is operable to provide connectivity to a wide area network (WAN) 254, such as the public switched telephone network (PSTN) or an X.25 packet switched network.

In another embodiment, communications controller 130 is further physically coupled to a network port 256, which is operable to provide connectivity to a local area network (LAN) 258, such as a LAN based on the Ethernet standard. In other embodiments, network port 256 may comprise a digital subscriber line (DSL) modem, cable modem, or other broadband communications system operable to connect the information processing system 200 to network 134. In these embodiments, network 134 may comprise the public switched telephone network (PSTN), the public Internet, a corporate intranet, a secure private network, or any combination of telecommunication technologies and protocols operable to establish a network connection for the exchange of information.

In a different embodiment, communications controller 130 is further physically coupled to a wireless modem 260, which is operable to provide connectivity to a wireless local area network (WLAN) 262, such as a WLAN based on variations of the IEEE 802.11 specification, often referred to as WiFi. In another embodiment, communications controller 130 is further physically coupled to a wireless modem 264, which is operable to provide connectivity to a wireless wide area network (WWAN) 266. In other embodiments, WWAN 266 is based on an industry standard including two and a half generation (2.5G) wireless technologies such as global system for mobile communications (GPRS) and enhanced data rates for GSM evolution (EDGE). In still other embodiments, WWAN 266 is based on existing third generation (3G) wireless technologies including universal mobile telecommunications system (UMTS) and wideband code division multiple access (W-CDMA). In yet other embodiments, WWAN 266 is based on the implementation of other 3G technologies, including evolution-data optimized (EVDO), IEEE 802.16 (WiMAX), wireless broadband (WiBro), high-speed downlink packet access (HSDPA), high-speed uplink packet access (HSUPA), and emerging fourth generation (4G) wireless technologies.

In still another embodiment, communications controller 130 is further physically coupled to a wireless modem 268, which is operable to provide connectivity to a wireless personal area network (PAN) 270. In one embodiment, PAN 270 is based on the Bluetooth standard. In another embodiment, PAN 270 is based on Ultra Wideband (UWB) technology. In these embodiments, PAN 270 provides connectivity to wireless modem 272, which is operable to provide further connectivity to a wireless wide area network (WWAN) 266.

In one embodiment peripheral device controller 126 is further physically connected, such as through a PCMCIA or PC Card slot, to wireless modem 274, which is operable to provide connectivity to a wireless personal area network (PAN) 270. In one embodiment, PAN 270 is based on the Bluetooth standard. In another embodiment, PAN 270 is based on Ultra Wideband (UWB) technology. In these embodiments, PAN 270 provides connectivity to wireless modem 274, which is operable to provide further connectivity to a wireless wide area network (WWAN) 266. In another embodiment, I/O controller 112 is further physically coupled to a USB port 274, which in turn is physically coupled to wireless modem 278, which is operable to provide connectivity to a wireless wide area network (WWAN) 266. In still another embodiment, I/O controller 112 is physically coupled to wireless modem 278 through an IEEE 1394 (Firewire) connection.

Figure 3:
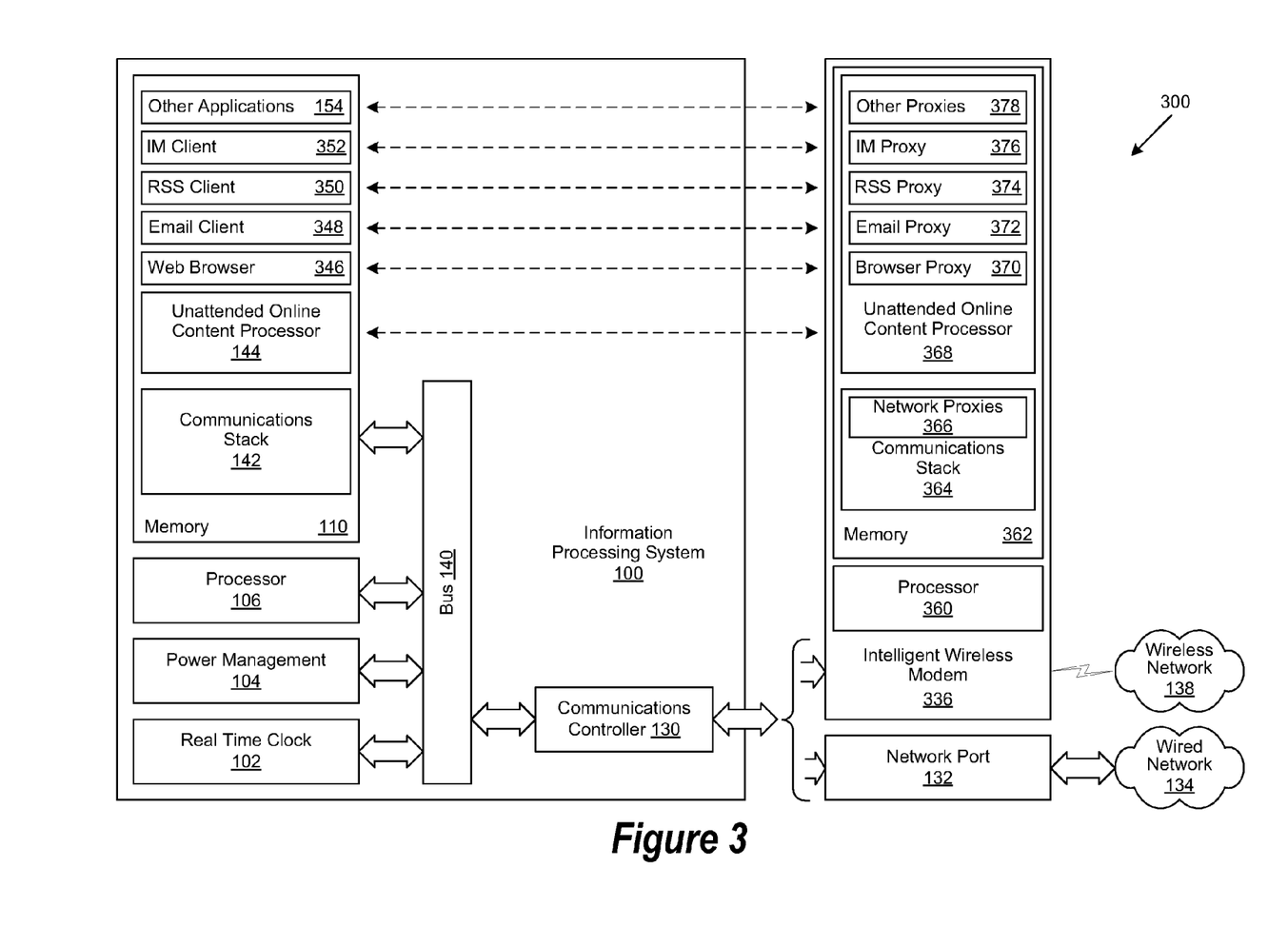
FIG. 3 is a generalized block diagram of an unattended online content processing system as implemented in accordance with an embodiment of the invention.

FIG. 3 is a generalized block diagram of an unattended online content processing system 300 as implemented in accordance with an embodiment of the invention. In various embodiments, real-time clock 102, power management module 104, processor 106, memory 142, and communications controller 130 are physically coupled via bus 140. In different embodiments, memory 110 comprises volatile random access memory (RAM), non-volatile read-only memory (ROM), non-volatile flash memory, or any combination thereof. In one embodiment, memory 110 also comprises communications stack 142, unattended content processor 144, web browser 346, email client application 348, really simple syndication (RSS) client application 350, instant messaging client application 352, and other applications 154.

In one embodiment, communications controller 130 is further physically coupled to a network port 132, which in turn couples the information processing system 100 to one or more physical networks 134, such as a LAN or the Internet. In other embodiments, network port 132 may comprise a digital subscriber line (DSL) modem, cable modem, or any combination of telecommunication technologies and protocols operable to establish a network connection for the exchange of information.

In another embodiment, communications controller 130 is further physically coupled to intelligent wireless modem 336, which is operable to provide connectivity to a wireless network 138, such as a PAN, WLAN or WWAN as described in greater detail herein. In this and other embodiments, intelligent wireless modem 336 comprises processor 360 and memory 362. In different embodiments, memory 362 comprises volatile random access memory (RAM), non-volatile read-only memory (ROM), non-volatile flash memory, or any combination thereof. Memory 362 comprises communications stack 364, which further comprises network proxies. Memory 362 also comprises unattended content processor 368, which further comprises proxies for a web browser 370, email client(s) 372, RSS client(s) 374, IM client(s) 376, and other applications 378.

Figure 4:
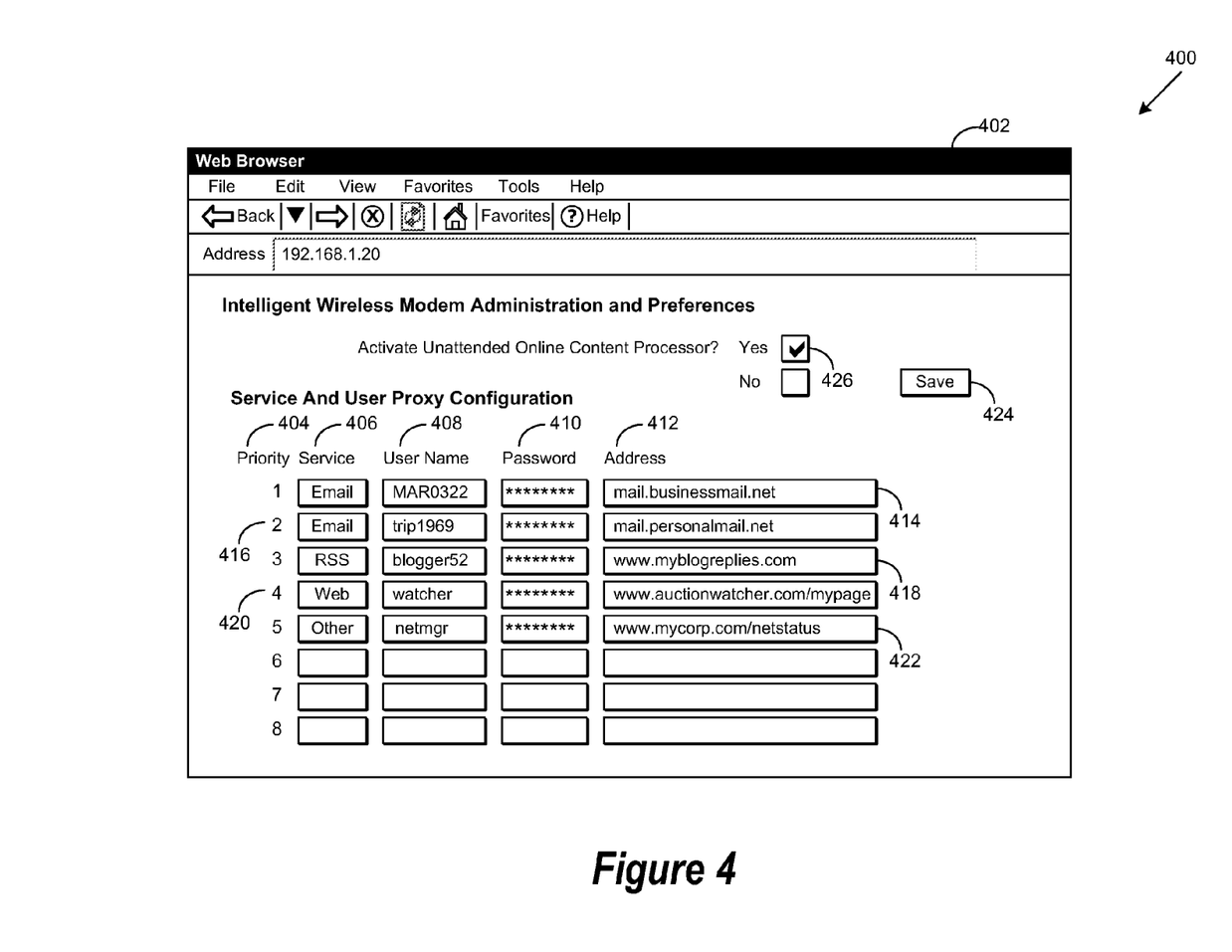
FIG. 4 is a generalized illustration of the user interface of an unattended online content processing system as implemented in accordance with an embodiment of the invention.

FIG. 4 is a generalized illustration of the user interface of an unattended online content processing system 400 as implemented in accordance with an embodiment of the invention. In one embodiment a web browser 402 is implemented to access an unattended online content processor application residing in the memory of an intelligent wireless modem. The user proxy information required to access each predetermined online content source. The proxy information comprises priority 404, the service type (e.g., email, RSS, Web, IM, other, etc.) 406, user name 408 and password 410 (if required), and network address 408. For example, proxy entries 414 are for a business email account while proxy entries 416 are for a personal email account. Similarly, proxy entries 418 allow the unattended online content processor application to retrieve RSS blog reply updates. In a similar fashion, proxy entries 420 allow access to an auction status web page. Likewise, proxy entries 422 allow access to a proprietary network management application. Once service and user proxy information has been entered, it is saved through a user gesture such as a mouse click on save button 424. Once saved, the unattended online content processor application is activated through similar user gesture on button 426. Once activated, the intelligent wireless modem will sense wireless network connectivity, and once sensed, will establish and maintain an optimal network connection. As described in greater detail herein, the unattended online content processor application will then use the proxy information to access the predetermined online content sources and retrieve predetermined content. Once retrieved, the content is stored within the intelligent wireless modem for later presentation or transferal when the mobile information processing system is being restored to a full power state.

Figure 5:
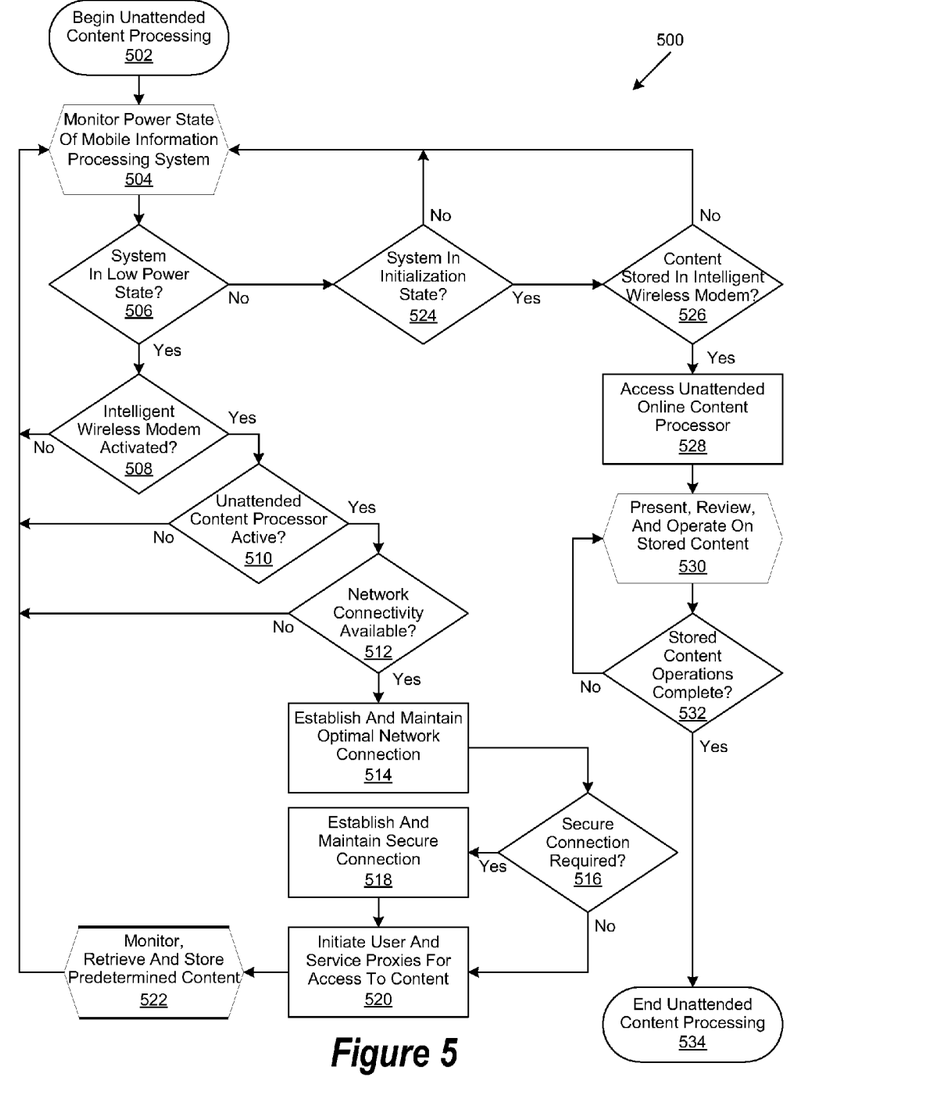
FIG. 5 is a generalized flow chart illustrating an unattended online content processing system as implemented in accordance with an embodiment of the invention.

FIG. 5 is a generalized flow chart illustrating an unattended online content processing system 500 as implemented in accordance with an embodiment of the invention. In this embodiment, unattended processing of online content by a mobile information processing system operating in a low power mode begins in step 502. In step 504, the power state of the mobile information processing system is monitored. If it is determined in step 506 that the system is operating in a low power state, then it is determined in step 508 whether an intelligent wireless modem is activated. If it is not, then the process is repeated, beginning with step 504. Otherwise, it is determined in step 510 whether the unattended content processor is active. If it is not, then the process is repeated, beginning with step 504. Otherwise, it is determined in step 512 whether network connectivity is available. If it is not, then the process is repeated, beginning with step 504. Otherwise, the intelligent wireless modem establishes and maintains optimal wireless network connectivity in step 512.

In one embodiment, the mobile information processing system is implemented with a single intelligent wireless modem, which is operable to provide connectivity with a predetermined type of wireless network (e.g., IEEE 802.11 WLAN). When activated, the intelligent wireless modem senses the availability of one or more predetermined wireless network, establishes an optimal connection, and then maintains while connectivity is available. For example, a mobile user is in their office and while their laptop is in a low power state, the intelligent wireless modem detects the presence of an IEEE 802.11 WLAN. The intelligent wireless modem establishes and maintains an optimal network connection with the WLAN until the user leaves the office, at which time the network connection is dropped. The user then carries their laptop computer, which is still in a low power state, to a nearby coffee shop. The coffee shop provides public access to its IEEE 802.11 WLAN, which is sensed by the intelligent wireless modem. Once sensed, the intelligent wireless modem similarly establishes and maintains an optimal connection to the coffee shop's WLAN until the user leaves the coffee shop, at which time the network connection is dropped.

In another embodiment, the mobile information processing system is implemented with a plurality of intelligent wireless modems, each of which is operable to provide connectivity with a predetermined type of wireless network (e.g., IEEE 802.11 WLAN, EDGE WWAN, etc). As each intelligent wireless modem senses the availability of the network protocol it supports (e.g., IEEE 802.11, IEEE 802.16, GPRS, EDGE, etc.), it establishes and maintains an optimal network connection until connectivity is no longer available.

In yet another embodiment, the mobile information processing system is implemented with a plurality of intelligent wireless modems, each of which has a predetermined priority for providing connectivity to the type of network it supports. For example, a laptop computer is implemented with both IEEE 802.11 WLAN and EDGE WWAN intelligent wireless modems, each of which is configurable for negotiation of connectivity prioritization. When the laptop computer enters a location where both IEEE 802.11 and EDGE connectivity is available, the wireless intelligent modems negotiate with each other to conform to a predetermined network connectivity prioritization. In one embodiment, the prioritization is based on wireless signal strength or quality of network service, with the intelligent wireless modem capable of providing a higher quality of network service receiving priority. In another embodiment, prioritization is based on network connectivity cost, with the wireless intelligent modem capable of providing less expensive network connectivity receiving prioritization.

Once an optimal wireless network connection is established and maintained in step 514, it is then determined in step 516 whether a secure connection is required for secure network connectivity. If it is, then the intelligent wireless modem implements one or more proxies to establish one or more secure connections in step 518. Once one or more secure connections have been established, or if it is determined in step 516 that no secure connection is required, user and service proxies are initiated in step 520 to access predetermined on-line content.

Once the user and service proxies are initiated in step 520, predetermined online sites and services are monitored by the unattended online content processor in step 522 for the identification, retrieval, and subsequent storage of predetermined content. For example, a weather site may provide weather updates, which based on predetermined criteria, are retrieved and then stored within the intelligent wireless modem. As another example, one or more user email accounts are accessed at predetermined intervals using email client proxies provided by the unattended online content processor. As emails become available, they are retrieved by the unattended online content processor and stored within the intelligent wireless modem. RSS news feed or instant message (IM) services are similarly accessed and monitored, with their respective content retrieved by the unattended online content processor and stored within the intelligent wireless modem. As yet another example, field work orders may be placed in queue in a field automation system. The unattended online content processor invokes the appropriate application proxy, accesses the field automation system, retrieves any work orders that are present, and then stores the work orders within the intelligent wireless modem.

The process of monitoring, identification, retrieval and storage of predetermined online content continues in step 522 while the power state of the mobile information processing system likewise continues to be monitored in step 504. If it is determined in step 506 that the mobile information processing system is no longer in a low power state, then it is determined in step 524 whether the mobile information processing system is in an initialization state, such as when it is returning to a full power state after being in a suspended state. If the mobile information processing system is not in an initialization state, the process is repeated, beginning with step 504.

Otherwise, it is determined in step 526 whether any retrieved online content is stored within the intelligent wireless modem. If no retrieved online content is stored in the intelligent wireless modem, then the process is repeated, beginning with step 504. Otherwise, the unattended online content processor is accessed in step 528 and content stored in the intelligent wireless modem is presented to the user in step 530 for review and other operations (e.g., read, reply, delete, etc.). In one embodiment the unattended online content processor presents stored content to the user before the mobile information processing system has completed its initialization. In another embodiment, the unattended online content processor transfers the information stored in the intelligent wireless modem to a predetermined storage location in the mobile information processing system. The transferred information is then made available to the user when the associated application is initiated. If it is determined in step 532 that stored content operations are not complete, then the process is repeated, beginning with step 530. Otherwise, unattended content processing operations are ended in step 534.

Skilled practitioners in the art will recognize that many other embodiments and variations of the present invention are possible. In addition, each of the referenced components in this embodiment of the invention may be comprised of a plurality of components, each interacting with the other in a distributed environment. Furthermore, other embodiments of the invention may expand on the referenced embodiment to extend the scale and reach of the system's implementation.

What is claimed is:

1. A system for the unattended processing of online content, comprising:
    a mobile information processing system operable to operate in a low power state;
    an intelligent wireless modem operable to connect said mobile information processing system to a wireless network when said mobile information processing system is operating in said low power state, wherein said intelligent wireless modem is activated when said mobile information system is operating in said low power state;
    processing logic to perform connectivity detection operations to determine the availability of a wireless network and to establish a communications channel operable to communicate information between said intelligent wireless modem and a predetermined online content source upon determining said availability of said wireless network, wherein said predetermined online content source is accessible through said communications channel; and
    an unattended online content manager operable to enable said intelligent wireless modem to perform content processing operations associated with said predetermined online content source.

2. The system of claim 1, wherein said at least one wireless network comprises a wireless local area network (WLAN).

3. The system of claim 1, wherein said at least one wireless network comprises a wireless wide area network (WWAN).

4. The system of claim 1, wherein said processing logic comprises proxy information configurable to enable said access to said at least one online content source.

5. The system of claim 4, wherein said proxy information is configurable to generate a secure network connection.

6. The system of claim 1, wherein said predetermined information processing operations comprise:
    accessing said at least one predetermined online content source;
    monitoring said at least one predetermined online content source to detect predetermined online content;

retrieving said predetermined online content storing said retrieved online content within said intelligent wireless modem presenting said stored content to a user of said mobile information processing system as said mobile information processing system is emerging from said low power state transferring said stored information from said intelligent wireless modem to said mobile information processing system after said mobile information processing system has returned to a full power state.

7. A method for the unattended processing of online content, comprising:

using a mobile information processing system operating in a low power state;

using an intelligent wireless modem to connect said mobile information processing system to a wireless network when said mobile information processing system is operating in said low power state, wherein said intelligent wireless modem is activated when said mobile information system is operating in said low power state;

using processing logic to perform connectivity detection operations to determine the availability of a wireless network and to establish a communications channel operable to communicate information between said intelligent wireless modem and a predetermined online content source upon determining said availability of said wireless network, wherein:

said communications channel is established with said processing logic;

said predetermined online content source is accessible through said communications channel; and using an unattended online content manager to enable said intelligent wireless modem to perform content processing operations associated with said predetermined online content source.

8. The method of claim 7, wherein said at least one wireless network comprises a wireless local area network (WLAN).

9. The method of claim 7, wherein said at least one wireless network comprises a wireless wide area network (WWAN).

10. The method of claim 7, wherein said processing logic comprises proxy information configurable to enable said access to said at least one online content source.

11. The method of claim 10, wherein said proxy information is configurable to generate a secure network connection.

12. The method of claim 7, wherein said predetermined information processing operations comprise:

accessing said at least one predetermined online content source;

monitoring said at least one predetermined online content source to detect predetermined online content;

retrieving said predetermined online content storing said retrieved online content within said intelligent wireless modem presenting said stored content to a user of said mobile information processing system as said mobile information processing system is emerging from said low power state transferring said stored information from said intelligent wireless modem to said mobile information processing system after said mobile information processing system has returned to a full power state.

13. A non-transitory machine-readable medium having a plurality of instructions stored thereon for execution by a processor to perform a method for the unattended processing of online content, comprising:

using a mobile information processing system operating in a low power state;

using an intelligent wireless modem to connect said mobile information processing system to a wireless network when said mobile information processing system is operating in said low power state, wherein said intelligent wireless modem is activated when said mobile information system is operating in said low power state;

using processing logic to perform connectivity detection operations to determine the availability of a wireless network and to establish a communications channel operable to communicate information between said intelligent wireless modem and a predetermined online content source upon determining said availability of said wireless network, wherein:

said communications channel is established with said processing logic;

said predetermined online content source is accessible through said communications channel; and using an unattended online content manager to enable said intelligent wireless modem to perform content processing operations associated with said predetermined online content source.

14. The non-transitory machine-readable medium of claim 13, wherein said at least one wireless network comprises a wireless local area network (WLAN).

15. The non-transitory machine-readable medium of claim 13, wherein said at least one wireless network comprises a wireless wide area network (WWAN).

16. The non-transitory machine-readable medium of claim 13, wherein said processing logic comprises proxy information configurable to enable said access to said at least one online content source.

17. The non-transitory machine-readable medium of claim 16, wherein said proxy information is configurable to generate a secure network connection.

18. The non-transitory machine-readable medium of claim 13, wherein said predetermined information processing operations comprise:

accessing said at least one predetermined online content source;

monitoring said at least one predetermined online content source to detect predetermined online content;

retrieving said predetermined online content storing said retrieved online content within said intelligent wireless modem presenting said stored content to a user of said mobile information processing system as said mobile information processing system is emerging from said low power state transferring said stored information from said intelligent wireless modem to said mobile information processing system after said mobile information processing system has returned to a full power state.

19. The non-transitory machine-readable medium of claim 13, wherein said computer executable instructions are deployable to a client computer from a server at a remote location.

20. The non-transitory machine-readable medium of claim 13, wherein said computer executable instructions are provided as a software service to a client computer on an on-demand basis.

* * * * *